P. PFEIFER.
SPLIT PULLEY.
APPLICATION FILED FEB. 6, 1911.
1,009,786.
Patented Nov. 28, 1911.
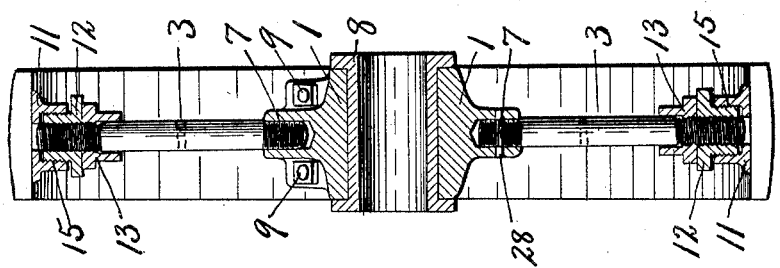
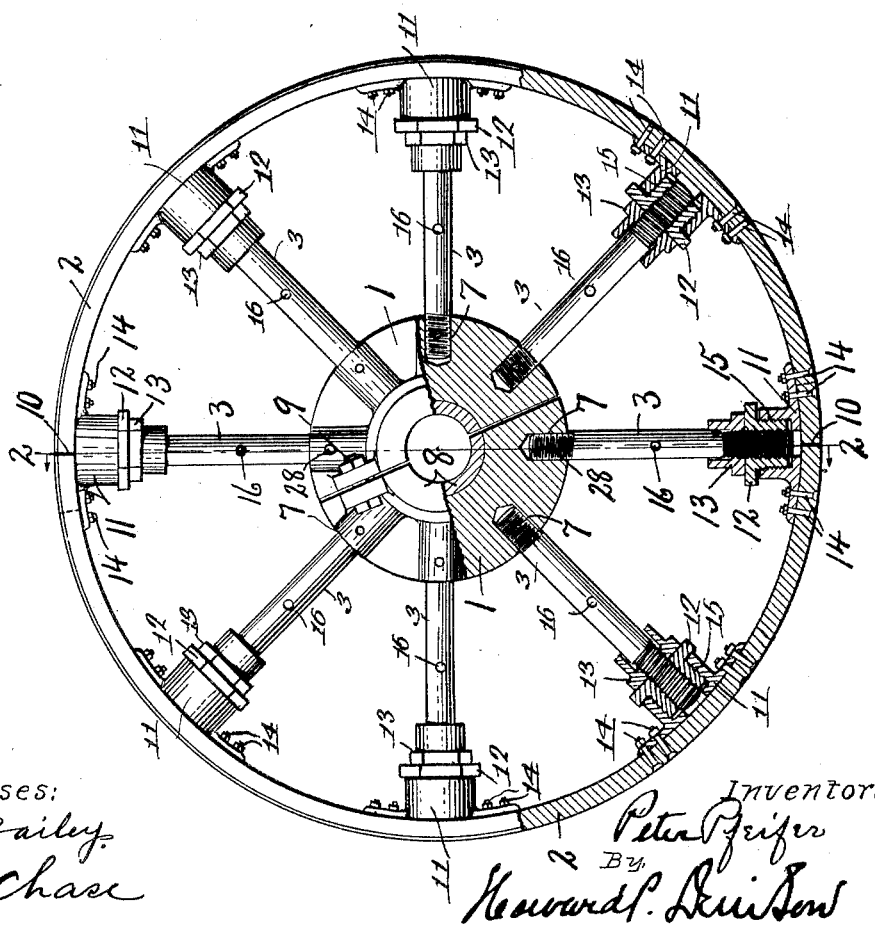
Witnesses:
Inventor:

UNITED STATES PATENT OFFICE.

PETER PFEIFER, OF DURHAMVILLE, NEW YORK.

SPLIT PULLEY.

1,009,786.  Specification of Letters Patent.  Patented Nov. 28, 1911.

Application filed February 6, 1911. Serial No. 606,891.

*To all whom it may concern:*

Be it known that I, PETER PFEIFER, of Durhamville, in the county of Oneida, in the State of New York, have invented new and useful Improvements in Split Pulleys, of which the following, taken in connection with the accompanying drawings, is a full, clear, and exact description.

This invention relates to certain improvements in split pulleys and refers more particularly to means for attaching the spokes to the rim and hub.

The main object is to provide means whereby any or all parts of the rim may be easily and quickly trued up or brought into exact concentricity with the axis of the pulley without disconnecting or removing any of the elements or portions thereof and at the same time utilizing the adjusting means for holding the rim in its adjusted position. In carrying out this object I preferably employ spokes having their opposite ends provided respectively with right and left hand threads engaged with correspondingly threaded sockets in or upon the rim and hub, and while I am aware that it is not new to employ spokes having their opposite ends provided with right and left hand threads, I have sought to render the use of such spokes more practicable not only as a connection between the hub and rim but more especially for truing up the rim and for holding all parts of said rim in exact concentricity when once adjusted.

A further object is to provide means for locking the spokes against turning when the rim has been properly adjusted.

Other objects and uses will be brought out in the following description:

In the drawings; Figure 1 is a side elevation partly in section of a pulley showing the fastening means for the spokes. Fig. 2 is a sectional view taken on line 2—2 Fig. 1.

This pulley comprises a split hub —1— and a sectional rim —2— which is connected to the hub by a plurality of spokes —3—, all of which have their ends threaded in opposite directions or provided with right and left hand threads so that the desired adjustment of the rim may be effected by the slight turning of the spokes.

The hub is divided diametrically between spokes and is provided with threaded sockets —7— into which the inner ends of the spokes are screwed and is also provided with a central shaft opening in which is fitted a split bushing —8—, which together with the hub is adapted to be clamped upon the shaft by clamping bolts —9— passing through apertured lugs on opposite ends of the hub.

The rim —2— may be made up of any number of segments and in the drawings I have shown it as composed of two substantially semi-circular sections having their abutting ends meeting in a line —10— within the opposite ends of the plates by which the adjacent ends of the spokes are connected to the rim as will be hereinafter more fully described. The specific connection between the spokes 3 and the rim consists of a rim plate —11—, flanged adjusting nut —12— and lock nut —13—, the inner ends of the spokes being screwed into their respective sockets —7— in the hub. The plates —11— are elongated circumferentially and are seated against the inner face of the rim to which they are screwed by suitable fastening means as bolts —14— located at opposite sides of the axes of their respective spokes. Each of the plates —11— is provided with an inwardly projecting hollow boss —15— threaded internally and into which the nut or sleeve —12— is screwed, said nut being threaded internally and screwed upon the adjacent end of the corresponding spoke where it is held against turning by the lock nut —13— also engaging this threaded portion of the spoke.

The threads between the spoke —3— and nut —12— and those between the nut —12— and plate —11— are preferably of opposite pitch, that is, the outer end of the spoke is preferably provided with a left hand thread, while the external thread of the nut and that of the socket —15— is preferably provided with a right hand thread so that the desired adjustment of this portion of the rim may be effected by a comparatively slight rotation of the nut —12— or a similar adjustment may be effected by the rotation of the spoke, which is provided with a transverse aperture —16— for receiving a suitable tool such as a round rod of sufficient length to form a handle by which the spoke may be turned, it being understood that this handle is removed when the desired adjustment is made.

The divisions —10— in the rim are positioned so as to register with points intermediate the plates —11— and preferably in line with the axes of adjacent spokes so that when the plates are screwed in operative position, they bridge across such division and thereby establish a rigid connection between the ends of the sections to prevent relative movement thereof and to hold such ends in exact concentricity.

In some instances I may prefer to additionally lock the spokes against turning after the rim has been adjusted and for this purpose I have shown the inner end of the spokes —3— as locked to the hub by suitable pins —28— said pins being capable of being removed or driven out when further adjustment is desired.

In assembling the parts of the pulley, the spokes may be screwed into the hub in the manner described and their rim plates screwed on their outer ends after which the rim sections may be placed upon the plates and screwed thereto by the bolts —14—, whereupon the rim may be trued up by turning such spokes as may be necessary or when the spokes —3— are used by turning the nuts —12— and when the lock nuts are used they may be tightened after the proper adjustment has been made.

What I claim is:

1. A pulley comprising a hub having radially-threaded sockets of one pitch, spokes having inner threaded ends of the same pitch screwing into said sockets and their outer ends provided with threads of different pitch, a rim surrounding the outer ends of the spokes, rim plates secured to the inner faces of the rim and provided with inwardly-extending interiorly-threaded bosses constituting sockets into which extend the outer ends of the spokes, and interiorly- and exteriorly-threaded adjusting nuts engaging with the outer ends of the spokes and further engaging with the interior threads of said bosses whereby the spokes are adjustably connected to the rim.

2. A pulley comprising a hub having radially-threaded sockets of one pitch, spokes having inner threaded ends of the same pitch screwing into said sockets and their outer ends provided with threads of different pitch, a rim surrounding the outer ends of the spokes, rim plates secured to the inner faces of the rim and provided with inwardly-extending interiorly-threaded bosses constituting sockets into which extend the outer ends of the spokes, interiorly- and exteriorly-threaded adjusting nuts engaging with the outer ends of the spokes and further engaging with the interior threads of said bosses whereby the spokes are adjustably connected to the rim, and lock nuts engaging with the outer threaded portions of the spokes and abutting against said adjusting nuts.

3. A pulley comprising a hub having radially-threaded sockets of one pitch, spokes having inner threaded ends of the same pitch screwing into said sockets and their outer ends provided with threads of different pitch, a rim surrounding the outer ends of the spokes, rim plates secured to the inner faces of the rim and provided with inwardly-extending interiorly threaded bosses constituting sockets into which extend the outer ends of the spokes, interiorly- and exteriorly-threaded adjusting nuts engaging with the outer ends of the spokes and further engaging with the interior threads of said bosses whereby the spokes are adjustably connected to the rim, and lock nuts engaging with the outer threaded portions of the spokes and abutting against said adjusting nuts, the opposing ends of the lock and adjusting nuts being flanged.

4. A pulley comprising a hub having radially-threaded sockets of one pitch, spokes having inner threaded ends of the same pitch screwing into said sockets and their outer ends provided with threads of different pitch, a rim surrounding the outer ends of the spokes, rim plates secured to the inner faces of the rim and provided with inwardly - extending interiorly - threaded bosses constituting sockets into which extend the outer ends of the spokes, and interiorly- and exteriorly-threaded adjusting nuts engaging with the outer ends of the spokes and further engaging with the interior threads of said bosses whereby the spokes are adjustably connected to the rim, said adjusting nuts being flanged, the flanges of said nuts adapted to abut against said bosses for limiting the movement in one direction of said nuts.

In witness whereof I have hereunto set my hand on this 1st day of February 1911.

PETER PFEIFER.

Witnesses:
H. E. CHASE,
E. F. SPEARING.

---

Copies of this patent may be obtained for five cents each, by addressing the "Commissioner of Patents, Washington, D. C."